United States Patent [19]

Poskett et al.

[11] Patent Number: 5,444,449
[45] Date of Patent: Aug. 22, 1995

[54] SYSTEM AND METHOD FOR REDUCING INTERFERENCE BETWEEN SATELLITES

[75] Inventors: Peter Poskett, Bucks; Dennis Mullins, London; Shimichi Nomoto, Middlesex, all of England; Stephane Gosselin, Lannion, France

[73] Assignee: International Mobile Satellite Organization, London, England

[21] Appl. No.: 168,875

[22] Filed: Dec. 15, 1993

[51] Int. Cl.[6] .......................... H04B 7/185; G01S 5/02
[52] U.S. Cl. ...................................... 342/354; 342/357
[58] Field of Search ................. 342/352, 354, 356, 357

[56] References Cited

U.S. PATENT DOCUMENTS 4,315,262 2/1982 Acampora et al. .
5,227,802 7/1993 Pullman et al. ...................... 342/352

*Primary Examiner*—Gregory C. Issing
*Attorney, Agent, or Firm*—Banner, Birch, McKie & Beckett

[57] ABSTRACT

A satellite system facilitates communications between earth stations and both geostationary satellites and non-geostationary satellites in an orbit at a lower altitude than that of said the geostationary satellites by preventing the non-geostationary satellite from transmitting signals that might possibly interfere with signals transmitted by the geostationary satellites. The non-geostationary satellite includes position acquisition subsystem for determining the position, and in particular the latitude, of the non-geostationary satellite relative to the surface of the earth. A data processor determines a forbidden band of locations on the surface of the earth all possible geostationary satellites and the non-geostationary satellite, at its determined position, are separated by less than a specified minimum discrimination angle. An antenna control subsystem in the non-geostationary satellite controls transmission of signal energy from the non-geostationary satellite in accordance with the satellites position so as to prevent transmission of signal energy from the non-geostationary satellite to said locations within the forbidden band.

19 Claims, 8 Drawing Sheets

SYSTEM AND METHOD FOR REDUCING INTERFERENCE BETWEEN SATELLITES

The present invention relates generally to satellite communication systems, and particularly to methods and systems for reducing signal interference between geostationary and non-geostationary satellite communication systems.

BACKGROUND OF THE INVENTION

The recent proliferation of satellite communication systems has increased the likelihood of interference between signals associated with neighboring satellites. Such interference can take place, for example, when a non-geostationary satellite comes within the field of view of a geostationary satellite. As is well known, geostationary satellites remain fixed in equatorial orbits over particular locations on the surface of the earth. Since geostationary satellites ordinarily exhibit some minor variation in latitude relative to the equatorial arc, there exists a narrow "geostationary band" centered about the equatorial arc corresponding to the set of orbital locations potentially occupied by geostationary satellites. Unlike geostationary satellites, the orbits of non-geostationary satellites continuously vary with respect to the earth's surface. Non-geostationary satellites typically traverse low and medium altitude orbits below the geostationary band.

Signal interference between geostationary and non-geostationary communication systems can result when non-geostationary satellites move into the field of view of ground stations oriented toward a particular satellite within the geostationary band. The potential for such interference arises whenever a non-geostationary satellite becomes located proximate the feeder link path between a geostationary satellite and one of its ground stations, hereinafter referred to as GSY ground stations. Such interference can occur because non-geostationary satellite systems are generally allocated, on a secondary basis, the same feeder link frequency bands primarily earmarked to geostationary systems. Consequently, it is incumbent upon the operators of non-geostationary systems to avoid disrupting communication within geostationary systems. Although it is conceivable that the feeder link band could be shared by geostationary and non-geostationary systems, the frequency separation required between the channels allocated to each system in order to ensure acceptable interference levels would make this approach infeasible under most circumstances.

Since geostationary satellites are distributed throughout the geostationary band above the surface of the equator, the points on the surface of the earth in approximate alignment with the geostationary band and a non-geostationary satellite form a range of "in-line" latitudes across the earth's surface. The position of this terrestrial in-line latitude range will vary with changes in the latitude of the non-geostationary satellite. Yet non-geostationary satellites may interfere with geostationary systems even when not so aligned between a geostationary satellite and a GSY ground station, since the antenna of the GSY ground station projects a radiation pattern across a finite discrimination angle relative to its beam axis. Accordingly, it has generally been necessary for non-geosynchronous satellites to cease signal transmission when in orbit above GSY ground stations in the vicinity of this in-line latitude range. This restriction on transmission range has hindered the performance of non-geostationary satellite systems coordinated in frequency with geostationary systems.

One way of minimizing interference between geostationary and non-geostationary systems would be simply to operate the non-geosynchronous system over frequency bands not already allocated to geostationary systems. Unfortunately, the limited frequency spectrum available for satellite communication systems renders this solution untenable. Moreover, well-established technology is available for implementing communications equipment designed to process signals over the frequency bands primarily allocated to geosynchronous systems.

It is therefore an object of the present invention to provide a method for minimizing the potential for interference between frequency-coordinated geostationary and non-geostationary satellite communication systems which does not require that non-geostationary signal transmission be suspended from all non-geostationary orbital locations in view of GSY ground stations.

SUMMARY OF THE INVENTION

In summary, the present invention is a method of facilitating frequency-sharing between a satellite system having a geostationary orbital band occupied by at least one geostationary satellite and a non-geostationary satellite in an orbit at a lower altitude than that of the geostationary satellite. The method includes the steps of: determining the position of the non-geostationary satellite relative to the surface of the earth; and calculating a minimum discrimination angle between the geostationary band and non-geostationary satellite at its determined position relative to a ground station on earth. The minimum discrimination angle corresponds to a predefined threshold of interference between signals received by the ground station from the non-geostationary satellite and geostationary satellites in the geostationary orbital band. The method further includes the step of defining a forbidden band of locations on the surface of the earth from which the geostationary orbital band and the non-geostationary satellite, at its determined position, are separated by less than the minimum discrimination angle. The present invention enables interference to be minimized by limiting transmission of signal energy from the non-geostationary satellite to regions outside of the forbidden band of locations.

Alternately, the present invention can be viewed as the signal transmission control apparatus for a non-geostationary satellite operating in conjunction with geostationary satellites.

BRIEF DESCRIPTION OF THE DRAWINGS

Additional objects and features of the invention will be more readily apparent from the following detailed description and appended claims when taken in conjunction with the drawings, in which:

FIG. 8a includes a representation on the earth's surface of the horizontal approximation of the forbidden band shown in FIG. 7a.

DESCRIPTION OF THE PREFERRED EMBODIMENT

Introduction

Figure 1:
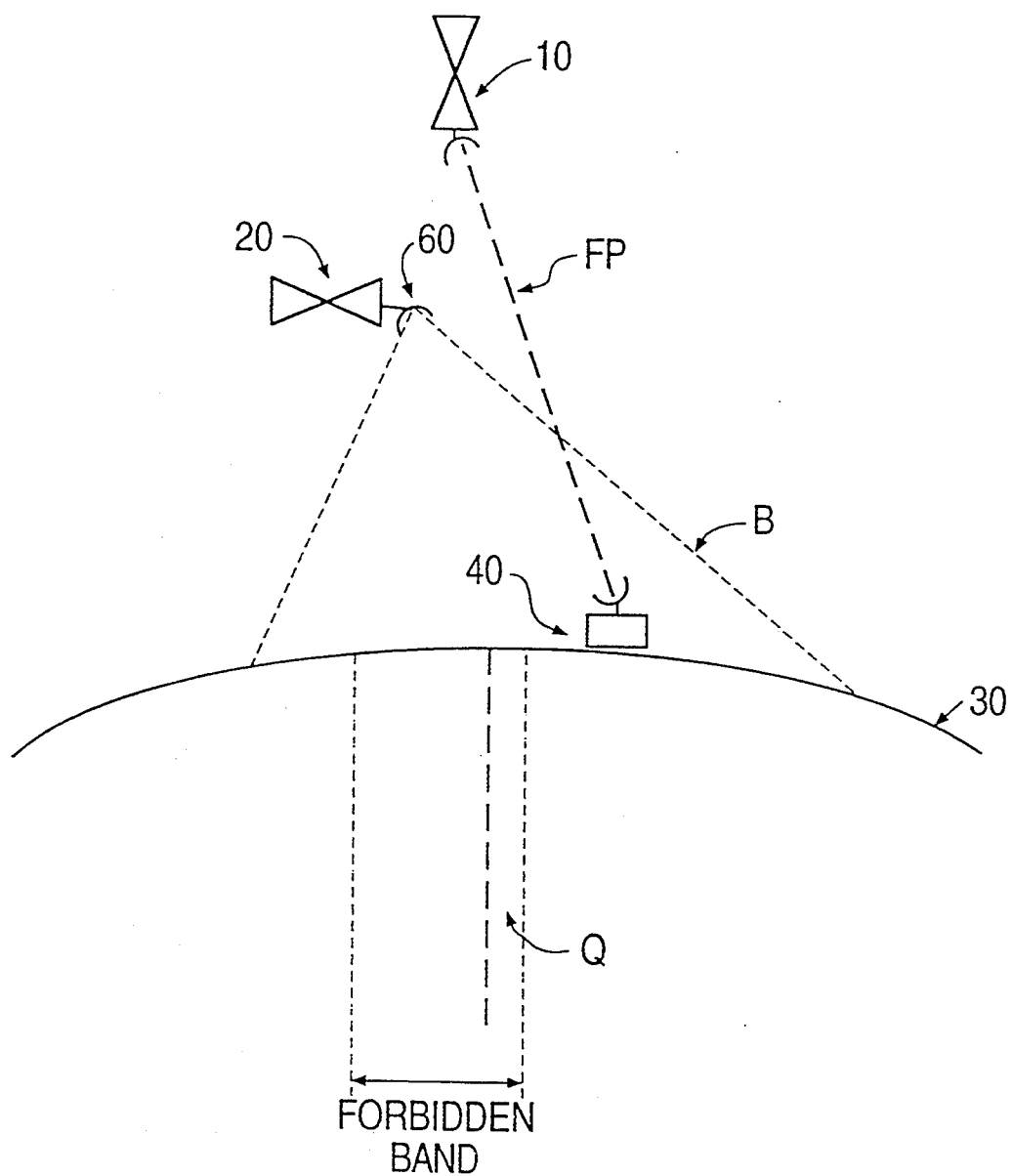
FIG. 1 shows a geostationary satellite and a non-geostationary satellite in orbit above the earth's surface.

Referring to FIG. 1, there is shown a geostationary satellite 10 and a non-geostationary satellite 20 in orbit above the earth's surface 30. The geostationary orbital trajectory of the satellite 10 passes perpendicularly through the plane of FIG. 1, while the non-geostationary satellite 20 may be assumed to be in a polar orbit transverse to the geostationary band. The geostationary satellite 10 occupies a location within the geostationary band above the equator Q, and hence remains in a fixed position relative to ground station 40. In the system shown in FIG. 1 the geostationary satellite 10 provides a communication link to the ground station 40. The geostationary satellite 10 communicates with the ground station 40 via antenna 60 over channels included within a feeder link band that may be simultaneously utilized by the non-geostationary satellite 20.

As may be appreciated by reference to FIG. 1, the potential for interference between the non-geostationary satellite 20 and the geostationary satellite 10 arises when the non-geostationary satellite 20 becomes located proximate the feeder link path (FP) between the geostationary satellite 10 and the ground station 40. In accordance with the invention, signals transmitted by the non-geostationary satellite 20 are prevented from interfering, beyond a predefined extent, with signal transmission between the geostationary satellite 10 and ground station 40 by modifying the antenna beam pattern B radiated by the non-geostationary satellite 20. As is described more fully below, this modification involves nulling the portion of the beam pattern incident on a "forbidden band" of latitudes (not shown to scale in FIG. 1) on the surface of the earth. The forbidden latitude range corresponds to the set of locations from which the angular separation, i.e., topocentric angle, between satellite positions within the geostationary band and the non-geostationary satellite is such that more than a minimum acceptable level of interference would exist between signals from the geostationary and non-geostationary satellites 10 and 20 if beam pattern B from the non-geostationary satellite 20 was not altered. The topocentric angular separation corresponding to this minimum acceptable level of interference is derived below, and will be referred to hereinafter as the minimum discrimination angle $D_{min}$.

Figure 2:
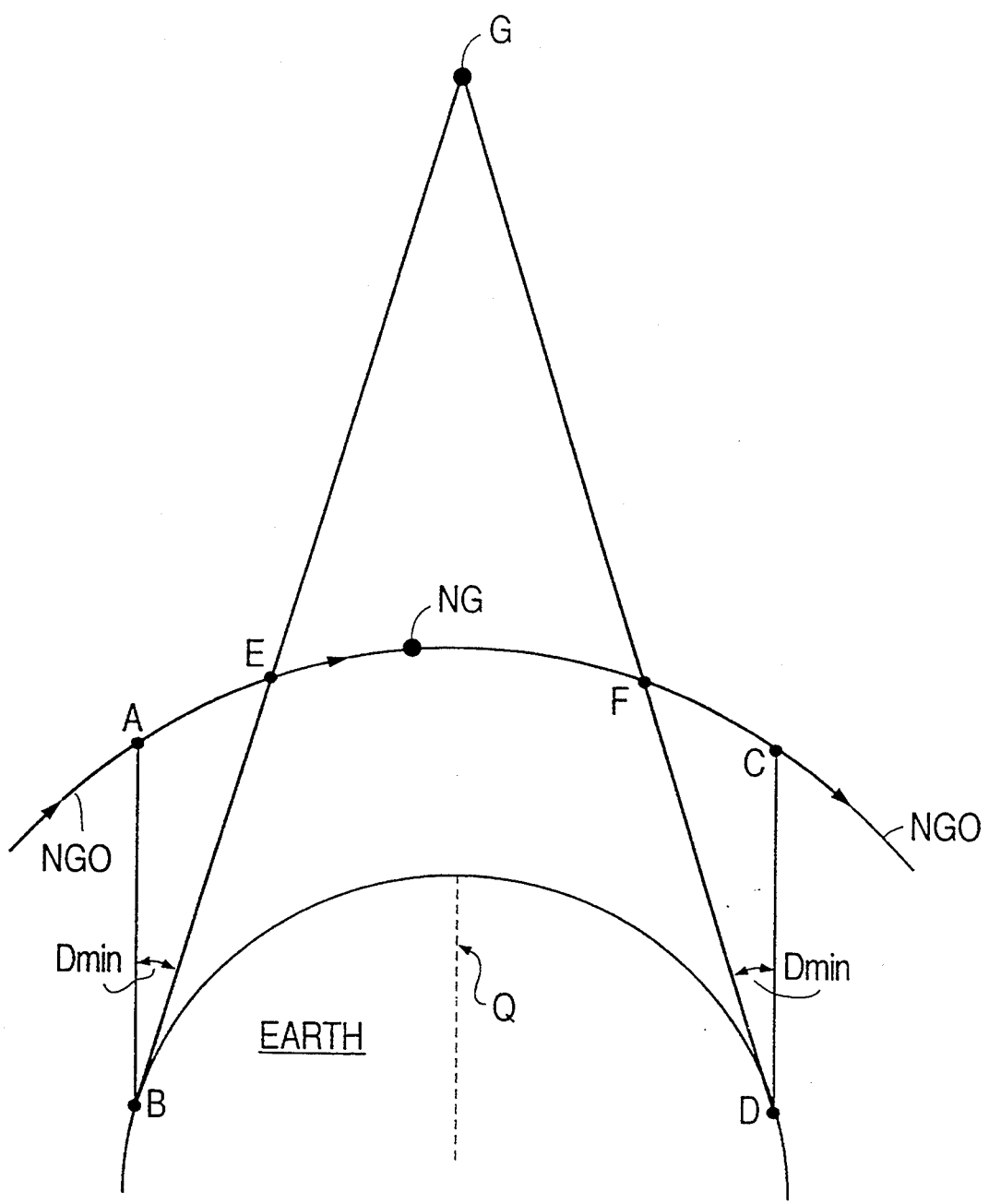
FIG. 2 illustratively represents the non-geostationary orbital path followed by a conventionally-equipped non-geostationary satellite relative to a geostationary satellite occupying an orbital location in the geostationary band above the equator.
Figure 3:
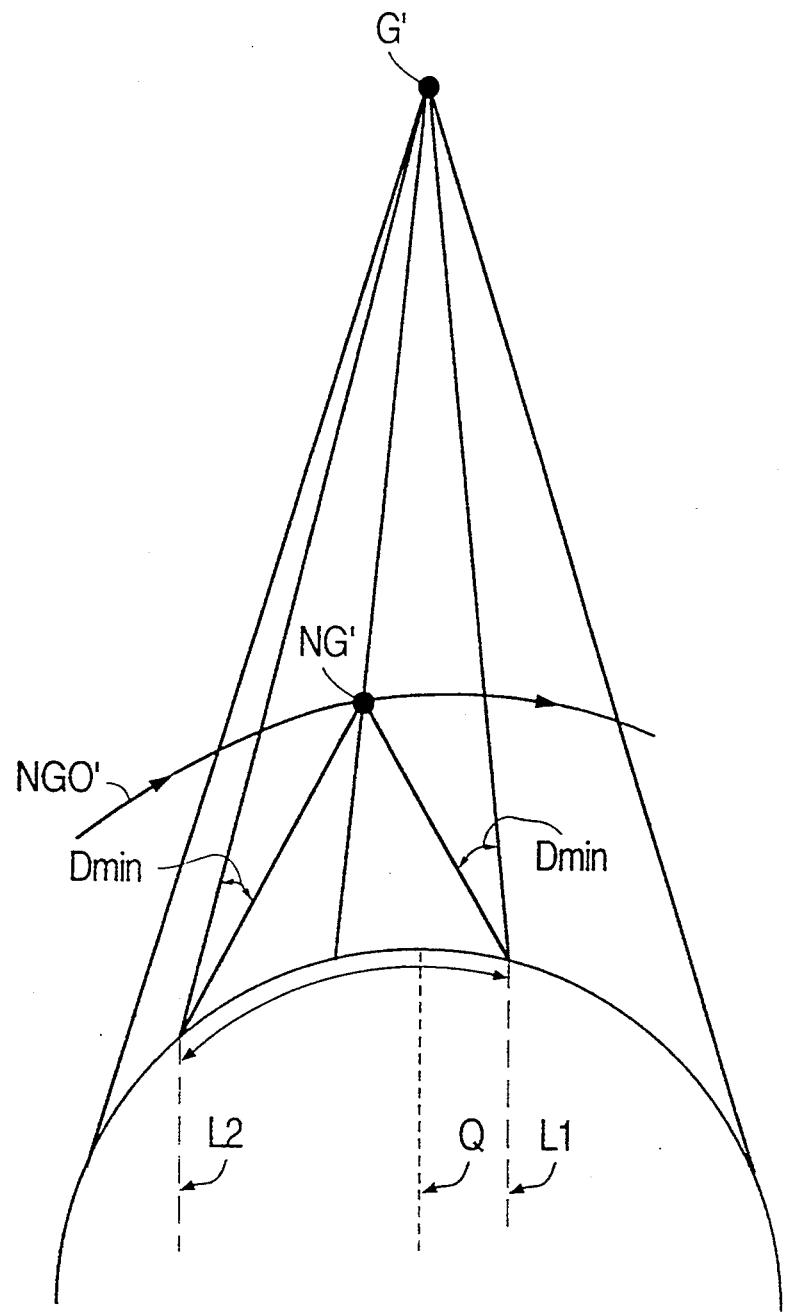
FIG. 3 shows a non-geostationary satellite NG' equipped with a forbidden band antenna control system traversing a non-geostationary orbital trajectory NGO'.

The manner in which the present invention allows a non-geostationary satellite to remain operational even when in view of ground stations in communication with geostationary satellites may be further appreciated with reference to FIGS. 2 and 3. FIG. 2 depicts a non-geostationary orbital path NGO followed by a conventionally-equipped non-geostationary satellite NG relative to an orbital location in the geostationary band, above the equator Q, of a geostationary satellite G. When the satellite NG reaches orbital location A, the topocentric angular separation between the two satellites from surface location B is equal to the minimum discrimination angle. As the satellite NG traverses the orbital path NGO between orbital locations A and C, there will exist points on the surface of the earth between locations B and D for which the topocentric angle between the satellites is less than the minimum discrimination angle $D_{min}$. This may be seen by observing that when the non-geostationary satellite NG occupies orbital positions between points E and F there exist locations between points B and D on the surface of the earth from which the two satellites are in alignment, i.e., locations at which the topocentric angle is zero. It is further observed that for non-geostationary orbital locations between positions A and E, and between positions F and C, the corresponding topocentric angles at points B and D, respectively, are less than $D_{min}$.

One way of guaranteeing that all ground stations between surface locations B and D experience less than the minimum acceptable level of interference would be to suspend transmission from the satellite NG while it is located between orbital positions A and C. The infeasibility of this approach, however, may be demonstrated by considering the following numerical example. Assuming a typical minimum discrimination angle $D_{min}$ of 3 degrees, a ±3 degree latitude variation of the geostationary satellite orbiting at a height of 35,786 km, and a non-geostationary orbit height of 1800 km, the non-geostationary satellite would need to be switched off when between latitudes approximately ±48 degrees from the equator. An interruption in communication due to this switch-off could only be avoided if other satellites having unused feeder link capacity were available to relay signals from the non-geostationary satellite to its ground station. As described in the following section, a non-geostationary satellite designed in accordance with the invention to selectively communicate only with locations not encompassed by a "forbidden band" of latitudes allows for substantially improved coverage range.

Overview of Forbidden Band Implementation

As shown in FIG. 3, a non-geostationary satellite NG' equipped with a forbidden band antenna control system is seen to follow a non-geostationary orbital trajectory NGO'. In accordance with the invention, the antenna beam projected by the satellite NG' is directed only to those regions on the surface of the earth from which the topocentric angular separation between the satellite NG' and the geostationary orbit exceeds the minimum discrimination angle $D_{min}$. In other words, for each latitude position on the orbital trajectory NGO' there exist locations on the earth between a forbidden band of latitudes within the field of view of the satellite NG' from which the topocentric angle is less than $D_{min}$. The location of this forbidden band of latitudes will shift as the satellite NG' traverses the orbital trajectory NGO'. In keeping with the invention, the antenna beam projected by the satellite NG' is shaped so as to only transmit signals to, and receive signals from, locations on the surface of the earth not covered by the forbidden band.

As shown in FIG. 3, the forbidden band of latitudes corresponding to the indicated orientation of the non-geostationary satellite NG' relative to a geostationary satellite G' extends from latitude L1 to latitude L2 about the equator Q. The forbidden band is positioned such that from the latitudes L1 and L2 the topocentric angle between the satellites is equivalent to the minimum discrimination angle $D_{min}$. It follows that the topocentric angle associated with locations within the forbidden band is less than $D_{min}$, while the topocentric angular separation between the satellites corresponding to locations outside of the forbidden band is larger than $D_{min}$. In a preferred embodiment of the invention the antenna beam pattern from the satellite NG' is continuously modified so as not to illuminate the forbidden band corresponding to the instantaneous latitude of the satellite NG'. This may be effected by, for example, selectively energizing a cluster of spot beams projected by the antenna of the satellite NG' in accordance with a switching algorithm. The switching algorithm will typically be responsive to latitude information received from either the orbit control system of the satellite or a ground station. In this regard a more detailed description of a forbidden band antenna control system is set forth in a following section.

Determination of the Minimum Discrimination Angle $D_{min}$

Interference calculations are performed by separately considering interference between non-geostationary and geostationary downlink (i.e., satellite to earth) and uplink (i.e., earth to satellite) frequency bands. That is, any interference between uplink and downlink bands is assumed to be of nominal magnitude relative to interference between bands of like type.

In a particular embodiment of the invention the value of the minimum discrimination angle, and hence the extent of the forbidden band, depends in part upon the signal to noise ratio required for communications carried by the feeder link between the geostationary satellite 10 and ground station 40. Determination of the impact of signal transmissions from the non-geostationary satellite 20 upon this signal to noise ratio will generally require knowledge of the frequency and modulation characteristics of the feeder link, as well as of specific aspects of the communications hardware incorporated within the geostationary and non-geostationary satellites 10 and 20 and within the ground station 40, In this regard it will generally be necessary to be aware of the shape, or type, of the antenna beam B nominally projected by the satellite 20, the gain of the antennas associated with the earth station 40 and geostationary satellite 10, and the frequency (e.g., C-Band, Ku-Band) and carrier characteristics (e.g., CDMA) of the feeder link.

Figure 4:
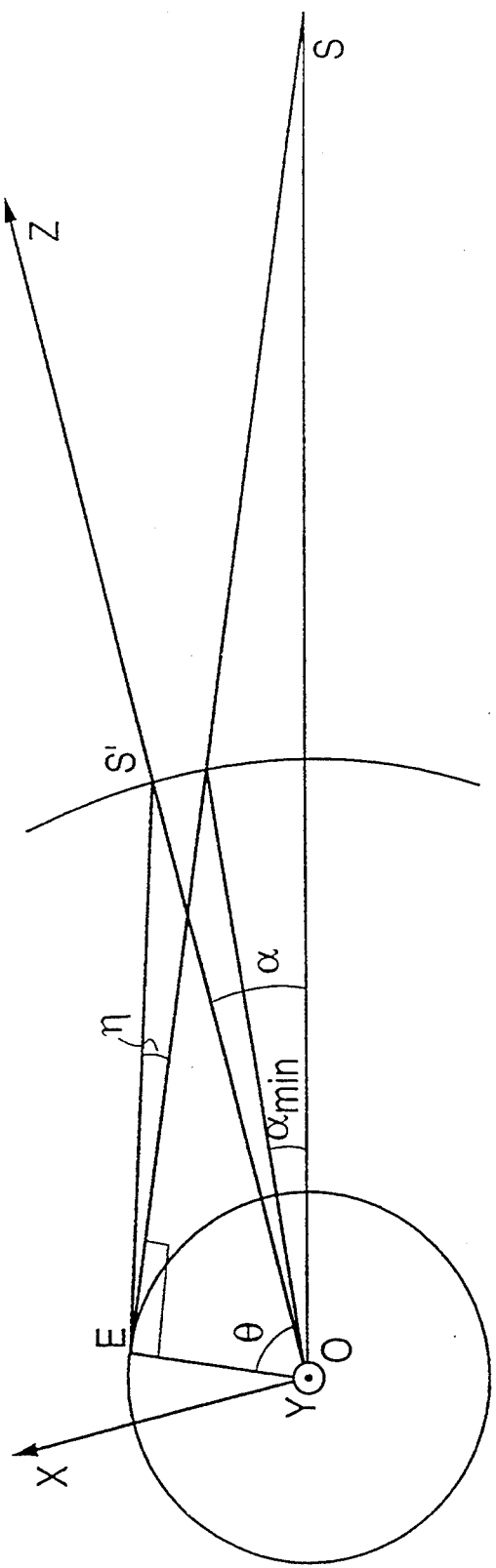
FIG. 4 depicts the relationship of a non-geostationary satellite relative to a geostationary satellite and to the earth.

Derivation of the Topocentric Angle $\eta$:

FIG. 4 is a diagram depicting the geometric relationship of a non-geostationary satellite S' relative to a geostationary satellite S and to the earth. The angular separation between the geostationary and non-geostationary satellites S and S' as seen from the center of the earth is denoted by $\alpha$, while the separation between these satellites as seen from the location of a ground station on the surface of the earth is identified as the topocentric angle $\eta$. Given a particular value of the angle $\alpha$ between the two satellites, the corresponding topocentric angle $\eta$ will vary in accordance with the location of the ground station on the surface of the earth. It is assumed that the worst case interference situations arise when the topocentric angle is at a minimum for a given geocentric angle $\alpha$; that is, interference will be most pronounced when the angular separation between the satellites is at a minimum when viewed from a ground station. Although the distances between the ground station and the satellites vary as a function of the latitude of the ground station, such variation is believed to have a negligible effect on interference levels relative to that arising as a consequence of changes in the topocentric angle $\eta$.

Referring to FIG. 4, it may be seen that there exist geocentric angles for which the minimum topocentric angle, i.e., $\eta_{min}$, is larger than zero. This corresponds to the situation in which the satellites are not aligned from any location on the surface of the earth. Whether or not the minimum topocentric angle $\eta_{min}$ is nonzero will depend upon the orbit heights h and h' of the geostationary and non-geostationary satellites relative to the surface of the earth. In particular, for orbit heights h and h' resulting in a geocentric angle $\alpha$ less than a threshold angle $\alpha_{min}$ there will exist ground station locations represented by the vector E for which the minimum topocentric angle $\eta_{min}$ is zero. Conversely, for satellite orbit configurations in which $\alpha > \alpha$ there exist ground station locations for which the associated topocentric angle $\eta_{min}$ is not zero. The angle $\alpha_{min}$ may be derived using plane geometry, and is expressed below as:

$$\alpha_{min} = \arccos\left(\frac{Ro}{Ro + h}\right) - \arccos\left(\frac{Ro}{Ro + h'}\right) \quad (1)$$

where Ro is the earth's radius, and h and h' are the respective orbit heights of the geostationary and non-geostationary satellites S and S' (h>h'). Again, instances in which the geocentric angle is superior to the limit value of equation (1) correspond to situations in which there are no ground station locations aligned with the two satellites, i.e., $\eta_{min} > 0$.

In what follows it is endeavored to determine an expression relating the location of a ground station to the topocentric angle $\eta$ between the satellites S and S' associated therewith. It is noted that the following calculations are referenced to the non-geostationary satellite S', as is indicated by the OXYZ coordinate system used in FIG. 4.

If Ro denotes the earth radius, and as previously mentioned h and h' the orbit heights of geosynchronous satellite S and non-geosynchronous satellite S', respectively, wherein $\phi$ and $\theta$ are the spherical coordinates of ground station location E in the OXYZ coordinate system, one has:

$$E = \begin{pmatrix} Ro\ \sin\theta\ \cos\phi \\ Ro\ \sin\theta\ \sin\phi \\ Ro\ \cos\theta \end{pmatrix} \quad (2)$$

$$S = \begin{pmatrix} -(Ro + h)\sin\alpha \\ 0 \\ (Ro + h)\cos\alpha \end{pmatrix}$$

$$S' = \begin{pmatrix} 0 \\ 0 \\ Ro + h' \end{pmatrix}$$

Letting r and r' denote the ranges from ground station location E to the satellites S and S', respectively, useful vectors are defined by:

$$\vec{ru} = ES \quad \vec{r'u'} = ES' \tag{3}$$

so that the cosine of the topocentric angle is:

$$\cos \eta = \vec{u} \cdot \vec{u}' \tag{4}$$

If one permits ground station location E to "move" on the surface of the earth while fixing the positions of satellites S and S', the opposite of the differential of E can be written:

$$-dE = dr u + r du = dr' u' + r' du' \tag{5}$$

The calculation of the scalar product of this equation with the two unit vectors leads to:

$$\begin{cases} u \cdot du' = \dfrac{dr - dr'\cos\eta}{r'} \\ u' \cdot du = \dfrac{dr' - dr\cos\eta}{r} \end{cases} \tag{6}$$

The differential of the cosine of the topocentric angle is then:

$$d(\cos\eta) = \frac{dr - dr'\cos\eta}{r'} + \frac{dr' - dr\cos\eta}{r} \tag{7}$$

If $\theta$ is fixed, r' does not vary, so that one has:

$$\frac{\partial(\cos\eta)}{\partial\phi} = \frac{1}{r} \frac{\partial r}{\partial\phi} \left( \frac{r}{r'} - \cos\eta \right) \tag{8}$$

The term in brackets is positive, so that the cosine of the topocentric angle follows the variations of r and thus the variations of the square of r, which is equal to:

$$r^2 = Ro^2 + (Ro+h)^2 - 2Ro(Ro+h)(\cos\theta \cos\alpha - \sin\theta \sin\alpha \cos\phi) \tag{9}$$

Hence, when only $\phi$ varies, the cosine of the topocentric angle follows the variations of the cosine of $\theta$ and therefore the topocentric angle, when $\theta$ is fixed, is minimum for $\phi = 0$.

In the rest of this section the geocentric angle is assumed to be sufficiently low that there exist ground station positions corresponding to $\phi = 0$ in the field of view of satellite S. This condition can be written:

$$\alpha \leq \arccos\left(\frac{Ro}{Ro + h}\right) \tag{10}$$

It should be noted that this condition is not very restrictive since the limit value, for a geostationary satellite S, is 81.3 degrees. The following notations are adopted for the rest of the section:

$$\begin{cases} \rho = \dfrac{Ro + h}{Ro} \quad \rho' = \dfrac{Ro + h'}{ro} \\ \beta = \arccos\left(\dfrac{1}{\rho}\right) \quad \beta' = \arccos\left(\dfrac{1}{\rho'}\right) \end{cases} \tag{11}$$

With these notations, the conditions on $\alpha$ can be written:

$$\beta - \beta' \leq \alpha \leq \beta \tag{12}$$

The fact that the ground station location represented by the vector E must be in the field of view of both satellites may be expressed using equation (12) as:

$$\theta \leq \beta - \alpha \tag{13}$$

Since the topocentric angle $\eta$ is the difference between the elevation of S' and the elevation of S as viewed from ground station location E, it is possible to represent the angle $\eta$ as follows:

$$\eta = \arctan\left(\frac{\cos\theta - \frac{1}{\rho'}}{\sin\theta}\right) - \arctan\left(\frac{\cos(\theta + \alpha) - \frac{1}{\rho}}{\sin(\theta + \alpha)}\right) \tag{14}$$

Thus, the topocentric angle $\eta$ decreases as the angle $\theta$ increases.

Forbidden Band Antenna Control System

Figure 5:
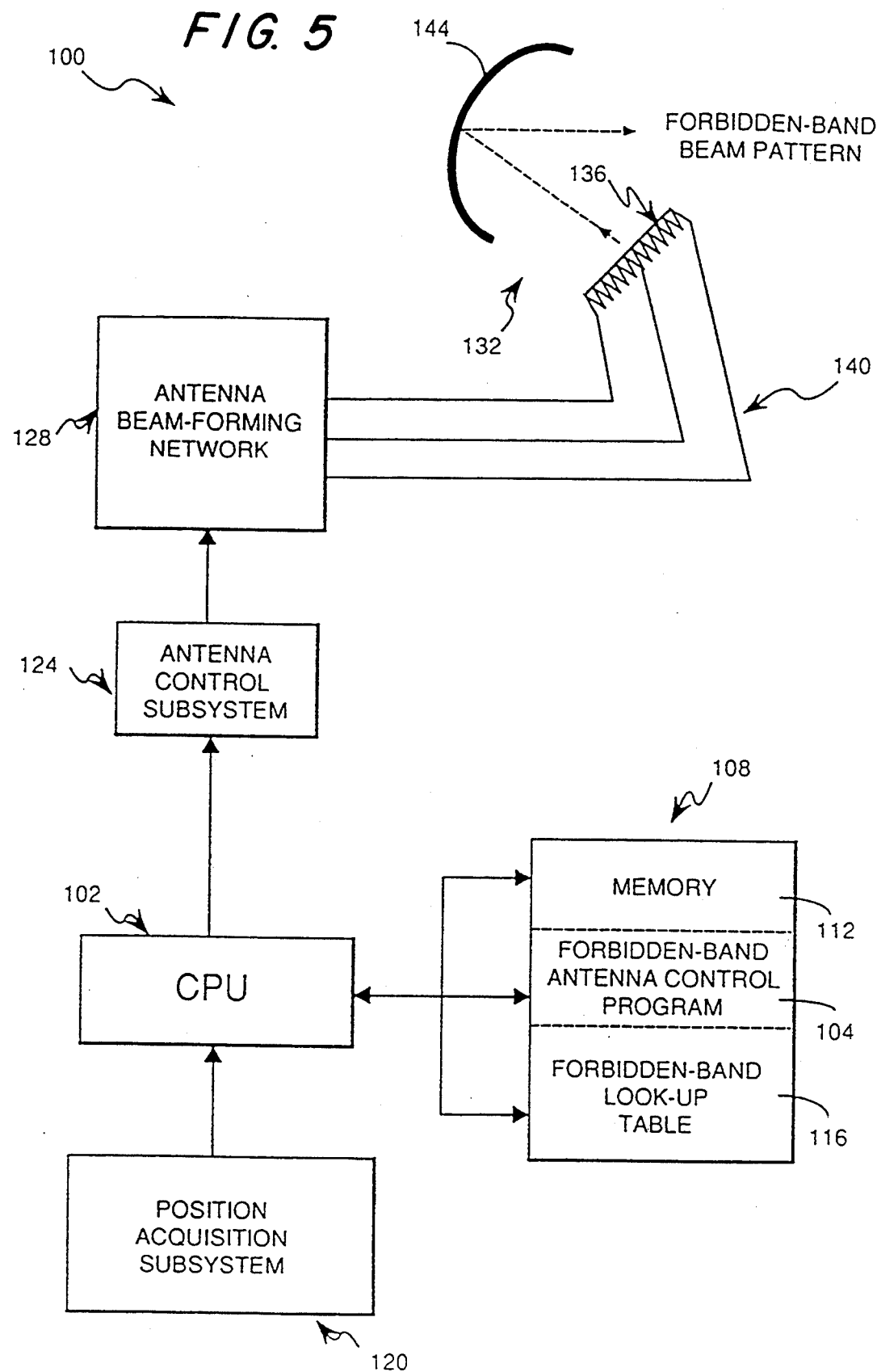
FIG. 5 shows a block diagram of a forbidden band antenna control system of the present invention designed for inclusion within a non-geostationary satellite.

Referring to FIG. 5, there is shown a block diagram of a forbidden band antenna control system 100 of the present invention designed to be included within, for instance, the non-geostationary satellite NG' depicted in FIG. 3. Operation of the control system 100 is coordinated by a central processing unit (CPU) 102, such as a microprocessor or the like, on the basis of instructions received from a forbidden-band antenna control program 104 stored within an on-board memory unit 108. The memory unit 108 further includes general purpose memory 112 and a forbidden-band look-up table 116.

The look-up table 116 contains information pertaining to the position and shape of the forbidden band of locations on the surface of the earth. While in particular embodiments the forbidden band may be approximated by a strip of surface locations included between a pair of latitude boundaries, more accurate representations of the forbidden band include latitude boundaries exhibiting a longitudinal dependence. When the former approximation is employed the look-up table 116 will include pairs of forbidden band latitude boundaries L1 and L2 (FIG. 3) indexed as a function of the latitude of the non-geostationary satellite NG'. It is anticipated that the look-up table would include boundaries of the forbidden latitude corresponding to a set of uniformly separated latitudes. An interpolation scheme could then be used to determine forbidden band boundaries corresponding to latitudes not included within the look-up table.

In order to approximate the forbidden band using latitude boundaries independent of longitude, the entries within the look-up table 116 could be derived in a simplified manner, for example, by using the expression for topocentric angle given by equation (14) above. In an initial step using this approach the minimum discrimination angle $D_{min}$ is determined as described in the preceding section. Following determination of $D_{min}$, computation of the topocentric angles corresponding to a selected set of latitudes on the surface of the earth is generated for each satellite latitude index stored within the look-up table 116. This step may be performed by, for example, substituting into equation (14) a trial set of latitudes spanning a range believed to encompass the forbidden latitude band corresponding to the associated satellite latitude index. The topocentric angle corresponding to each latitude within the trial set is then compared with $D_{min}$ in order to determine the latitude boundaries L 1 and L2 of the forbidden band. That is, there will exist a pair of latitudes L1 and L2 within the trial set such that for all forbidden latitudes therebetween the associated topocentric angle will be less than $D_{min}$. This description of a simplified technique for determining the boundaries of the forbidden band is included at this juncture in order to enhance understanding of the control system 100. Accordingly, a more complete discussion of a method for determining the limits of the forbidden band is detailed in a subsequent section.

Referring to FIG. 5, the antenna control system 100 also includes a position acquisition subsystem 120 for supplying to the CPU 102 information relating to the orbital location of the non-geostationary satellite. The forbidden band antenna control program 104 uses the orbit latitude provided by the subsystem 120 to retrieve the boundaries of the forbidden band from the look-up table 116. The CPU 102 then relays the retrieved forbidden band boundaries to an antenna control subsystem 124. The control subsystem 124 operates in a conventional manner to configure an antenna beam-forming network 128 used to drive the antenna 132 of the non-geostationary satellite. The subsystem 124 controls the shape of the beam pattern projected by the antenna by determining which of the feed elements within a feed array 136 are to be energized by the beam-forming network 128. Electromagnetic energy is conventionally coupled from the beam forming network 128 to the feed array 136 by waveguide 140, and is then directed by the feed 136 to a doubly-curved shaped reflector 144. Although FIG. 5 depicts a particular system for projecting a forbidden-band beam pattern, other means within the scope of the invention may be used to perform this function.

For example, in an alternate embodiment of the antenna control system the look-up table includes information relating to longitudinal variation in the positions of the forbidden band boundaries. Such more precise forbidden band representations could each be stored, for example, as a two-dimensional matrix associated with a particular orbit latitude of the non-geostationary satellite. A set of mathematical expressions from which these two-dimensional forbidden band representations could be derived is set forth below. The geometric parameters included within the following expressions are defined within the diagram of FIG. 6, in which are shown various geometrical relationships between a geostationary (GSO) satellite G and non-geostationary (non-GSO) satellite l relative to the earth.

In another implementation of the antenna control system the look-up table will include data corresponding to amplitude and phase coefficients used in controlling individual elements within the antenna feed array. Such control data will generally be transmitted from a ground station and stored within the look-up table prior to initiation of satellite operation. Since the orbit of non-geostationary satellites is periodic, it is not required to generate a separate set of control data based on recurring sets of geometrical satellite position parameters. Although this approach may require a larger memory than implementations involving on-board generation of antenna control signals, it is simpler with regard to processing requirements and the like. Moreover, in this approach control data corresponding to representations of the forbidden band exhibiting longitudinal variation could be stored as easily as those in which the shape of the forbidden band is specified simply by a pair of latitudes.

Geometrical Context of Forbidden Band Calculations

In what follows it is assumed that the position of the non-GSO satellite is fixed at a given latitude, such that all calculations correspond to a given instant in the non-GSO satellite orbital period. This allows longitude to be determined relative to the non-GSO satellite. The GSO satellite considered can have any longitude and a latitude between $-3$ and $+3$ degrees, a range corresponding to the typical latitude drift of GSO satellites. In all of the following calculations the variable of interest corresponds to the location of the ground station M on the surface of the earth.

The following notations will be used hereinafter:
O, center of the earth;
Ro, radius of the earth;
l, the non-GSO satellite positioned at latitude l and orbit height h';
G, the GSO satellite positioned at longitude L, latitude $\Delta$l and orbit height h wherein longitude is measured relative to the non-GSO satellite;
lo, the point of latitude 0 and relative longitude 0 at the same height as l; and
M, the instantaneous location of the ground station on the surface of the earth.

A first reference frame in FIG. 6 defined relative to the position of the non-GSO satellite may be characterized as follows:
lz is a vector directed from the non-GSO satellite to the center of the earth;
ly is a vector in the longitude plane containing l, is directed perpendicular to lz, and points in the north direction; and
lx is oriented such that lxyz is orthonormal.

A second frame of reference is denoted as loXYZ, and is similar to the reference frame lxyz but uses lo rather than l as an origin. The reference frame lxyz may be obtained by rotating the reference frame loXYZ through an angle l with respect to the axis OX. The notations used within the second reference frame of FIG. 6 are:

$$\begin{cases} OM = Ro = a \\ OI = Ro + h' = b \\ OG = Ro + h = c \\ \rho = \frac{b}{c} \\ GI = d \\ \eta = IMG = \text{topocentric angle} \end{cases} \quad (15)$$

The spherical coordinates of M in lxyz are $(r, \theta, \phi)$ so that its cartesian coordinates in lxyz are $(r \sin\theta \cos\phi, r \sin\theta \sin\phi, r \cos\theta)$. A pair of directions of interest are given by the following unit vectors:

$$\begin{cases} u = \frac{1}{GI} \cdot GI \\ v = \frac{1}{IM} \cdot IM \end{cases} \quad (16)$$

Determination of Forbidden Directions of Transmission from the non-GSO Satellite In a preferred approach the forbidden transmission directions from the non-GSO satellite are calculated with respect to a set of orbit locations within the geostationary band, i.e., potential positions of the GSO satellite. The forbidden directions derived with respect to each GSO satellite position may be envisioned as forming a beam, originating at the non-GSO satellite, the edges of which illuminate points on the earth's surface from which the topocentric angles between the non-GSO satellite and the associated GSO satellite are equal to the minimum discrimination angle $D_{min}$. The following section describes a method for determining the shape of the forbidden beam in terms of a set of unit vectors $\vec{v}$, wherein each value of $\vec{v}$ specifies a linear path between the non-GSO satellite and a location on the surface of the earth. In this way the contour of the forbidden band of locations on the surface of the earth may be determined with knowledge of the shape of the forbidden beam.

Figure 6:
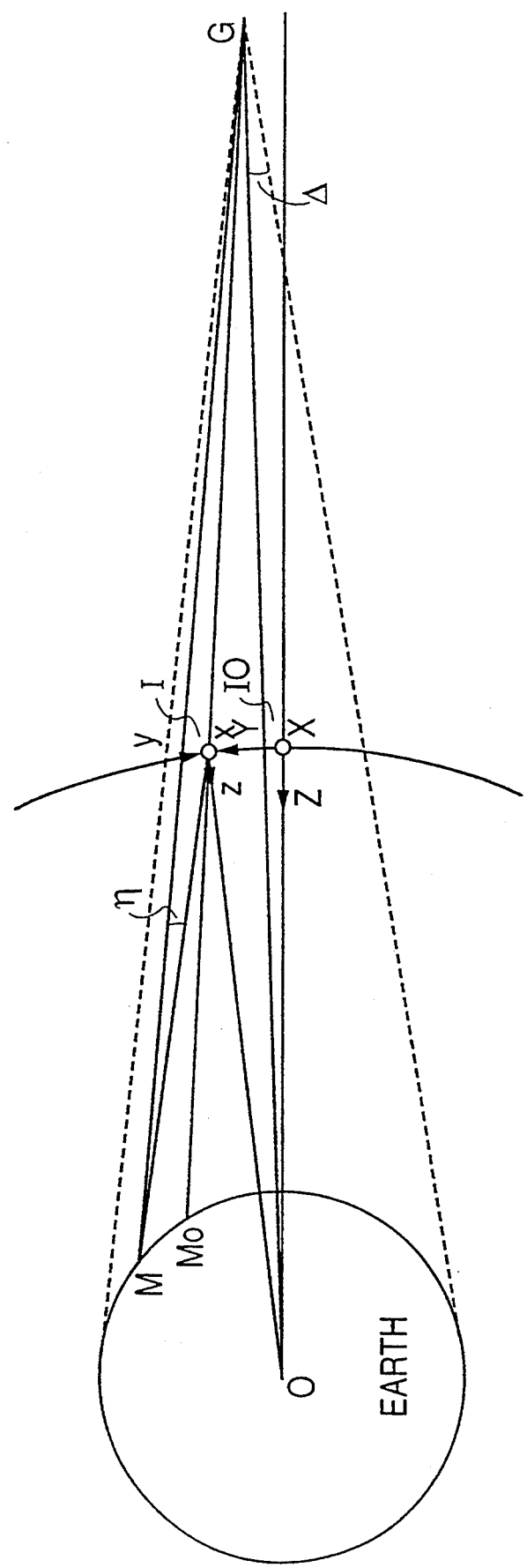
FIG. 6 is a diagram depicting various geometrical relationships between a geostationary satellite G and a non-geostationary satellite I relative to the earth.

Referring to FIG. 6, the coordinates of the satellite G may be expressed in terms of the non-GSO satellite reference lxyz as follows:

$$OG_{(xyz)} = \begin{pmatrix} 1 & 0 & 0 \\ 0 & \cos I & \sin I \\ 0 & -\sin I & \cos I \end{pmatrix} \begin{pmatrix} -c\sin I\cos\Delta I \\ c\sin\Delta I \\ -c\cos L\cos\Delta I \end{pmatrix} = \quad (17)$$

$$\begin{pmatrix} -c\sin L\cos\Delta I \\ c\sin\Delta I\cos I - c\cos L\cos\Delta I\sin I \\ -c\sin\Delta I\sin I - c\cos L\cos\Delta I\cos I \end{pmatrix}$$

so that:

$$\frac{1}{c} GI_{(xyz)} = \begin{pmatrix} \sin L\cos\Delta I \\ \cos L\cos\Delta I\sin I - \sin\Delta I\cos I \\ \cos L\cos\Delta I\cos I + \sin\Delta I\sin I - \rho \end{pmatrix} \quad (18)$$

By calculating the scalar square of equation (18), one obtains:

$$d = c\sqrt{1 + \rho^2 - 2\rho(\cos L\cos I\cos\Delta I + \sin I\sin\Delta I)} \quad (19)$$

The range r between a ground station location and the non-GSO satellite may be expressed as:

$$r = b\cos\theta - \sqrt{a^2 - b^2\sin^2\theta} \quad (20)$$

Furthermore, $$\cos\eta = \frac{1}{MI \cdot MG} \cdot MI \cdot MG = \quad (21)$$

-continued $$\frac{MI^2 + MI \cdot IG}{MI \cdot \sqrt{(MI + IG)^2}} = \frac{r + d \cdot u \cdot v}{\sqrt{d^2 + r^2 + 2rd \cdot u \cdot v}}$$

leads to:

$$u \cdot v = -\frac{r}{d} \sin^2\eta + \cos\eta\sqrt{1 - \frac{r^2\sin^2\eta}{d^2}} \quad (22)$$

Combining equations (19), (20) and (22), one thus has $\vec{u}\cdot\vec{v}$ in function of $\theta$. The two unit vectors given by equation (16) may also be represented in the xyz reference as follows:

$$\begin{cases} u_{(xyz)} = \frac{1}{\sqrt{1 + \rho^2 - 2\rho(\cos L\cos I\cos\Delta I + \sin I\sin\Delta I)}} \cdot \begin{pmatrix} \sin L\cos\Delta L \\ \cos L\sin I\cos\Delta I - \cos I\sin\Delta L \\ \cos L\cos I\cos\Delta I + \sin I\sin\Delta L - \rho \end{pmatrix} \\ v_{(xyz)} = \begin{pmatrix} \sin\theta\cos\phi \\ \sin\theta\sin\phi \\ \cos\theta \end{pmatrix} \end{cases} \quad (23)$$

so that:

$$u \cdot v = \frac{(\sin L\cos\Delta I\sin\theta\cos\phi + (\cos L\sin I\cos\Delta I - \cos I\sin\Delta I)\sin\theta\sin\phi + (\cos L\cos I\cos\Delta I + \sin I\sin\Delta I - \rho)\cos\theta))}{\sqrt{1 + \rho^2 - 2\rho(\cos L\cos I\cos\Delta I + \sin I\sin\Delta I)}} \quad (24)$$

Combined with the other expression of $\vec{u}\cdot\vec{v}$ given in equation (22), equation (24) leads to a relation between $\theta$ and $\phi$, which can be written:

$$A(\theta) \cos \phi + B(\theta) \sin \phi = C(\theta) \quad (25)$$

This results in 0, 1 or 2 values of $\theta$ for a given value of $\phi$. For a solution $(\theta, \phi)$ of the equation, the corresponding unit vector $\vec{v}$ corresponds to the direction of a ray on the periphery of the "forbidden beam", i.e., the beam defined by the values of l, L, $\Delta$l and $\eta$. The calculation of $\phi$ values corresponding to a sufficient number of $\theta$ values thus yields an approximation of the contour of the forbidden beam under consideration. Superposition of a sufficient number of forbidden beams, with each forbidden beam corresponding to a particular GSO satellite location, enables determination of the forbidden band of locations on the surface of the earth associated with the location of the non-GSO satellite. In a particular implementation the GSO satellite locations considered are at specified values of allowed GSO satellite drift latitude (e.g., +3 and −3 degrees). At each drift latitude calculations are performed from a plurality of longitudes relative to the longitude of the non-GSO satellite.

Representation of the Forbidden Band in the Non-GSO Satellite Reference

Referring to FIG. 6, each direction from the non-GSO satellite l is represented by the projection in plane lxy of the corresponding unit vector. Each forbidden direction, defined by a value of $\theta$ and a value of $\phi$, is thus represented in a plane by a point of cartesian coordinates ($x = \sin\theta \cos\phi$, $y = \sin\theta \sin\phi$). In this representation format the field of view of the non-GSO satellite is circular.

It is noted that this representation format differs from a satellite reference in which azimuth and elevation are specified. In these two representations the directions from the satellite are related by:

$$\begin{cases} x = \cos El \sin Az \\ y = \sin El \end{cases} \quad (26)$$

and are thus coincident when small angles are involved. In azimuth/elevation representation, the field of view of the satellite will not be circular unless both the azimuth and the elevation angles are small.

An exact representation of the forbidden band requires consideration of the forbidden beams corresponding to all positions within the geostationary band within view of the non-GSO satellite under consideration. Nonetheless, in particular implementations it may be sufficient to approximate this exact representation by a horizontal latitude band encompassing all points within the exact representation. This approximation may be defined in terms of two values of elevation within the field of view of the non-GSO satellite. Moreover, this horizontal approximation of the forbidden band allows a straightforward realization of the antenna 132 (FIG. 5) of the non-GSO satellite as a conventional linear feed array.

Figure 7A:
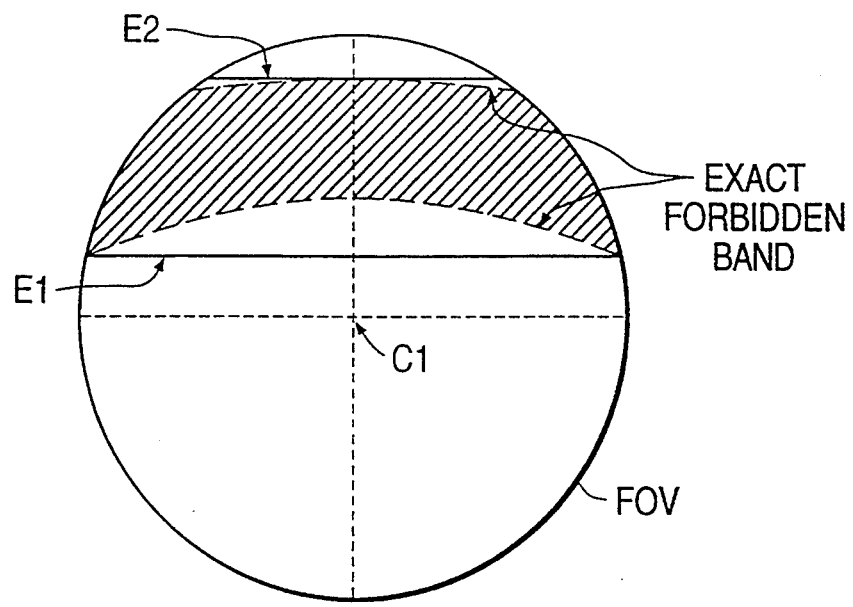
FIG. 7a shows an exact representation and an approximation of a forbidden band within the field of view of a non-geostationary satellite.

Referring to FIG. 7a, an exact representation and an approximation of a forbidden band are shown within the field of view (FOV) of a non-geostationary satellite. In particular, the exact forbidden band is shown as the cross-hatched region between the dashed lines while the horizontal approximation is defined by the elevations E1 and E2. The particular example of FIG. 7a corresponds to the situation in which the non-GSO satellite is in orbit at an altitude of 1800 km at a latitude of 25 degrees, and in which the minimum discrimination angle required for acceptable interference is 7 degrees. This results in a forbidden band approximation in which the elevations E1 and E2 are at 10.1 degrees and 41.8 degrees, respectively, relative to the center C1 of the non-GSO field of view.

Figure 7B:
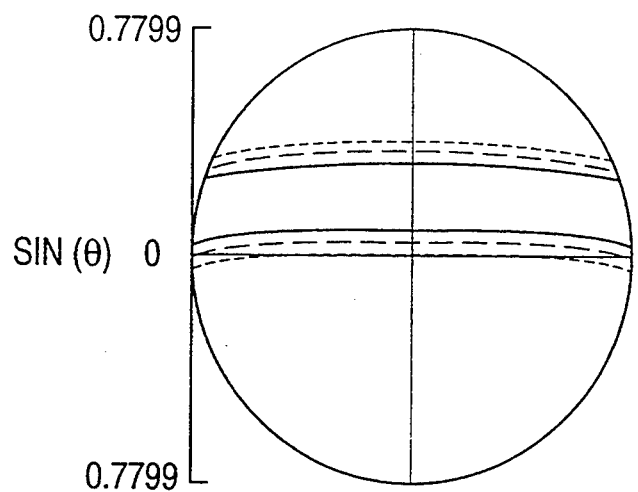
FIG. 7b shows a projection of a forbidden band in the field of view of a non-geostationary satellite located at a particular orbital position.

An additional example of a projection of the forbidden band within the field of view of a non-GSO satellite at an altitude of 1800 km at a latitude of 10 degress is provided by FIG. 7b. Specifically, forbiddent bands are shown for minimum discrimination angles of 3 degress (solid line), 5 degrees (dashed line), and 7 degrees (dotted line). In the representation of FIG. 3 the forbidden bands correspond to orthographic (sine) projections mapped according to the function $\sin(\theta)$, where $\theta$ denotes latitude.

Representation of Forbidden Band on Surface of Earth

In this section the forbidden band within the non-GSO satellite reference depicted in FIG. 7a will be transformed to a corresponding forbidden band on the surface of the earth. The transformation entails calculation of the longitude $L_M$ and latitude $l_M$ (with respect to the non-GSO satellite position) of the point M on the earth's surface corresponding to a given direction from the non-GSO satellite. This calculation requires finding an xyz coordinate representation of the vector OM based on the following expression:

$$\begin{cases} -a\cos l_M \sin L_M = r\sin\theta\cos\phi \\ a\sin l_M = r\sin\theta\sin\phi\cos I - r\sin I\cos\theta + b\sin I \\ -a\cos l_M \cos L_M = r\sin\theta\sin\phi\sin I + r\cos\theta\cos I - b\cos I \end{cases} \quad (27)$$

The values of $l_M$ and $L_M$ are then simply derived as functions of $\theta$ and $\phi$. This transformation from $(\theta,\phi)$ to $(L_M, l_M)$ allows the intersection with the earth's surface of any ray from the non-GSO satellite to be represented in terms of longitude and latitude upon an earth map. The transformation is initiated by considering (i) the representation of the field of view of the non-GSO satellite:

$$\theta = \arcsin\left(\frac{a}{b}\right) \quad (28)$$

and, (ii) the two values of elevation (El) within the non-GSO reference frame associated with the boundaries of the horizontal approximation of the forbidden band. The following expression holds at each boundary elevation El:

$$\sin\theta \sin\phi = \sin El \quad (29)$$

Figure 8A:
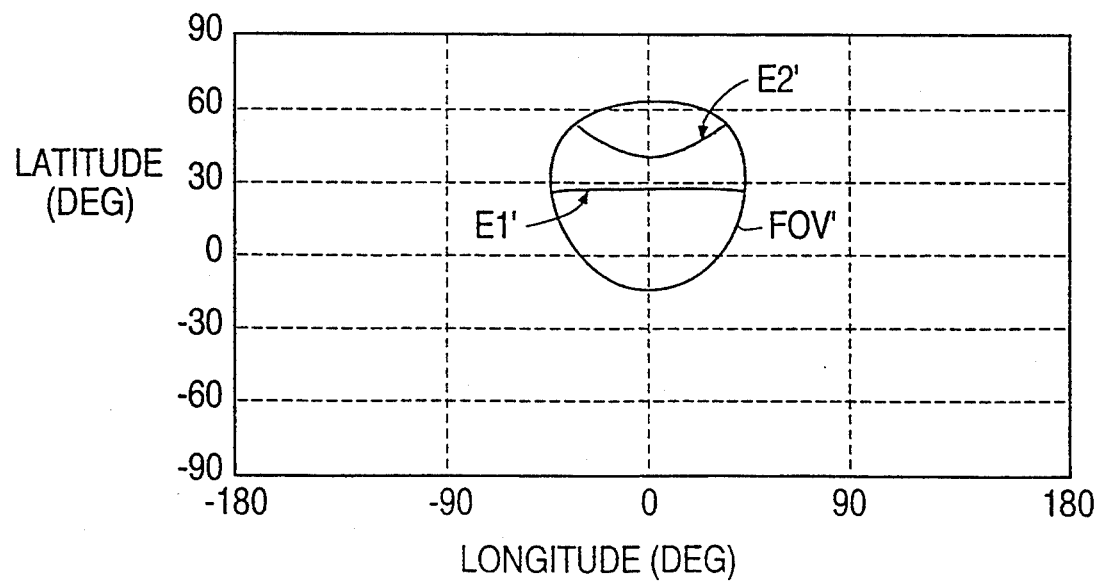

Referring to FIG. 8a, there is shown a representation on the earth's surface of the horizontal forbidden band of FIG. 7a. Specifically, the field of view of the non-GSO satellite is denoted in FIG. 8a by the solid line FOV′, while the limits of the approximation of the forbidden band are indicated by the dashed line E1′ and E2′. It is noted that the horizontal limits E1 and E2 of the forbidden band within the non-GSO satellite reference are transformed to the curved segments E1′ and E2′ on the earth's surface.

Figure 8B:
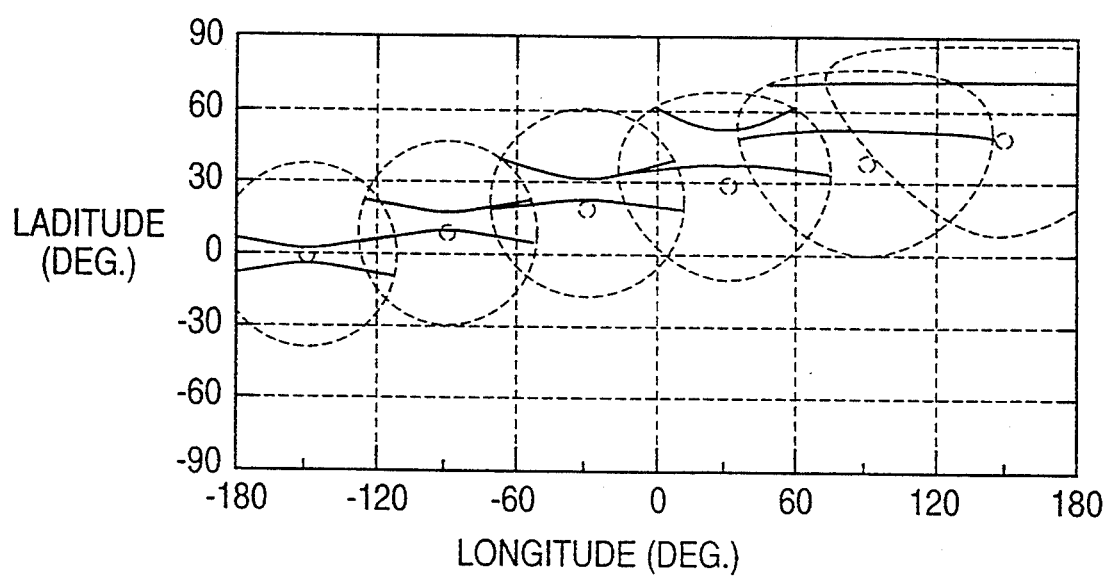
FIG. 8b shows a representation of a set of forbidden bands on the surface of the earth corresponding to various non-geostationary orbital positions.

As an additional example, FIG. 8b shows projections upon the earth's surface of a set of forbidden bands (solid lines) together with the projections of the associated fields of view (dashed lines). The projections correspond to a plurality of latitude positions of a non-GSO satellite in orbit at an altitude of 1800 km, and assume a minimum discrimination angle of 7 degrees. The relative longitudinal positions of the forbidden bands were varied in order to minimize mutual superposition.

Alternative Implementations,

Referring again to FIG. 5, in other embodiments of the antenna control system 100 the boundaries of the forbidden band could be determined in real-time rather than using a look-up table 116. For example, latitude and longitude information from the position acquisition subsystem 120 (FIG. 5) could be used by a microprocessor or the like on-board the non-geostationary satellite to determine the shape of the forbidden band in accordance with the analytical expressions set forth in the above equations. In another implementation such real-time calculations would be performed at a ground station and transmitted to the non-geostationary satellite. In each of these implementations the control system 100 would then operate as described above to project an antenna beam only to those regions outside of the forbidden band.

While the present invention has been described with reference to a few specific embodiments, the description is illustrative of the invention and is not to be construed as limiting the invention. Various modifications may occur to those skilled in the art without departing from the true spirit and scope of the invention as defined by the appended claims.

What is claimed is:

1. A method of operation of a satellite system having a geostationary orbital band occupied by at least one geostationary satellite and a non-geostationary satellite in an orbit at a lower altitude than that of said at least one geostationary satellite, comprising the steps of:

determining position of said non-geostationary satellite relative to the surface of the earth;

calculating a minimum discrimination angle between said geostationary band and non-geostationary satellite at its determined position relative to a ground station on earth, wherein said minimum discrimination angle corresponds to a predefined threshold of interference between signals received by said ground station from said non-geostationary satellite and geostationary satellites in said geostationary orbital band;

defining a forbidden band of locations on the surface of the earth from which said geostationary orbital band and said non-geostationary satellite, at its determined position, are separated by less than said minimum discrimination angle; and controlling transmission of signal energy from said non-geostationary satellite in accordance with said position thereof so as to prevent transmission of signal energy from said non-geostationary satellite to said locations within said forbidden band.

2. The method of operation of claim 1 wherein said step of controlling transmission further includes the step of adjusting an antenna beam pattern projected by said non-geostationary satellite such that energy therefrom is not incident upon said locations within said forbidden band.

3. The method of operation of claim 2 wherein said step of adjusting said antenna beam pattern further includes the step of projecting spot beams only to regions on the surface of the earth outside of said forbidden band of locations.

4. The method of operation of claim 1 wherein said step of defining a forbidden band of locations on the surface of the earth includes the step of specifying a forbidden band of latitude range on the surface of the earth from within which selected orbital positions proximate said geostationary orbit are separated from said non-geostationary satellite by less than said minimum discrimination angle.

5. The method of operation of claim 1 wherein said step of controlling transmission includes the step of preventing transmission of signals from said non-geostationary satellite within a field of view thereof encompassing said forbidden band.

6. The method of operation of claim 1 wherein said step of defining a forbidden band of locations on the surface of the earth includes the step of storing forbidden bands of locations corresponding to selected positions of said non-geostationary satellite in a memory on said non-geostationary satellite.

7. The method of operation of claim 6 wherein said step of controlling transmission of signal energy from said non-geostationary satellite includes the step of preventing transmission of signal energy from said non-geostationary satellite to said forbidden bands of locations stored in said memory in accordance with said determined position of said non-geostationary satellite.

8. A satellite system having a geostationary orbital band occupied by at least one geostationary satellite and a non-geostationary satellite in an orbit at a lower altitude than that of said at least one geostationary satellite, said non-geostationary satellite including an antenna control subsystem comprising:

position acquisition means for determining position of said non-geostationary satellite relative to the surface of the earth;

a data processor, coupled to said position acquisition means, that defines a forbidden band of locations on the surface of the earth from which said geostationary orbital band and said non-geostationary satellite, at its determined position, are separated by less than a specified minimum discrimination angle; and means, coupled to said data processor, for controlling transmission of signal energy from said non-geostationary satellite in accordance with said position thereof so as to prevent transmission of signal energy from said non-geostationary satellite to said locations within said forbidden band.

9. The system of claim 8 wherein said means for controlling transmission further includes means for adjusting an antenna beam pattern projected by said second satellite such that energy therefrom is not incident upon said locations within said forbidden band.

10. The system of claim 9 wherein said means for adjusting said antenna beam pattern further includes means for projecting spot beams only to regions on the surface of the earth outside of said forbidden band of locations.

11. The system of claim 8 wherein said data processor includes means for specifying a forbidden band of latitude range on the surface of the earth from within which selected orbital positions proximate said geostationary orbit are separated from said second satellite by less than said minimum discrimination angle.

12. The system of claim 8 wherein said means for controlling transmission includes means for preventing transmission of signals from said second satellite within a field of view thereof encompassing said forbidden band.

13. The system of claim 8 wherein said data processor further includes a memory that stores forbidden bands of locations corresponding to selected positions of said non-geostationary satellite in a memory on said non-geostationary satellite.

14. The system of claim 13 wherein said means for controlling transmission of signal energy from said non-geostationary satellite includes means for preventing transmission of signal energy from said non-geostationary satellite to said forbidden bands of locations stored in said memory in accordance with said determined position of said non-geostationary satellite.

15. A method of operation of a satellite system having a geostationary orbital band occupied by at least one geostationary satellite and a non-geostationary satellite in an orbit at a lower altitude than that of said at least one geostationary satellite, comprising the steps of:

determining position of said non-geostationary satellite relative to the surface of the earth;

defining a forbidden band of locations on the surface of the earth from which said geostationary orbital band and said non-geostationary satellite, at its determined position, are separated by less than a specified minimum discrimination angle corresponding to a predefined threshold of interference at the surface of the earth between signals from said non-geostationary satellite and said geostationary satellites in said geostationary orbital band; and controlling transmission of signal energy from said non-geostationary satellite in accordance with said position thereof so as to prevent transmission of signal energy from said non-geostationary satellite to said locations within said forbidden band.

16. The method of operation of claim 15 wherein said step of controlling transmission further includes the step of adjusting an antenna beam pattern projected by said non-geostationary satellite such that energy therefrom is not incident upon said locations within said forbidden band.

17. The method of operation of claim 16 wherein said step of adjusting said antenna beam pattern further includes the step of projecting spot beams only to regions on the surface of the earth outside of said forbidden band of locations.

18. The method of operation of claim 15 wherein said step of defining a forbidden band of locations on the surface of the earth includes the step of storing forbidden bands of locations corresponding to selected positions of said non-geostationary satellite in a memory on said non-geostationary satellite.

19. The method of operation of claim 18 wherein said step of controlling transmission of signal energy from said non-geostationary satellite includes the step of preventing transmission of signal energy from said non-geostationary satellite to said forbidden bands of locations stored in said memory in accordance with said determined position of said non-geostationary satellite.

* * * * *